(12) United States Patent
Murakami et al.

(10) Patent No.: US 7,113,252 B2
(45) Date of Patent: Sep. 26, 2006

(54) METHOD OF MENDING BREAKAGE OF LINE IN DISPLAY DEVICE

(75) Inventors: Katsuaki Murakami, Kumamoto (JP); Yasushi Matsui, Kumamoto (JP); Akio Nakayama, Kumamoto (JP)

(73) Assignee: Advanced Display, Inc., Nishigoshi-Machi (JP)

( * ) Notice: Subject to any disclaimer, the term of this patent is extended or adjusted under 35 U.S.C. 154(b) by 0 days.

(21) Appl. No.: 10/948,392

(22) Filed: Sep. 22, 2004

(65) Prior Publication Data

US 2005/0052445 A1    Mar. 10, 2005

Related U.S. Application Data

(62) Division of application No. 10/210,713, filed on Jul. 30, 2002, now abandoned.

(30) Foreign Application Priority Data

Jul. 31, 2001   (JP) .............................. 2001-232221

(51) Int. Cl.
*G02F 1/13*   (2006.01)
(52) U.S. Cl. .................... 349/192; 349/39; 349/54; 349/55
(58) Field of Classification Search ............. 349/38, 349/39, 54, 192, 55
See application file for complete search history.

(56) References Cited

U.S. PATENT DOCUMENTS 6,259,494 B1 *   7/2001   Kawai et al. ................. 349/39
6,404,465 B1     6/2002   Nakayama et al. ............ 349/39
6,545,730 B1     4/2003   Hwang ....................... 349/43

FOREIGN PATENT DOCUMENTS

| JP | 2000098423 A | 4/2000 |
|----|--------------|--------|
| JP | 2000171825 A | 6/2000 |

OTHER PUBLICATIONS

English language Abstract of JP 02000171825A (Feb. 22, 2004), East Version: 1.4.1).
Patent abstract of Japan, O. Shinsuke et al., "Liquid Crystal Image Display Device and Method for Relieving its Disconnection Defect," Publication No. 09-061852, Publication Date Jul. 3, 1997.

* cited by examiner

*Primary Examiner*—Andrew Schechter
*Assistant Examiner*—Michael H. Caley (57) ABSTRACT

A display device includes a scanning line (1) formed on an insulating substrate; a storage capacitance line (3) formed in parallel to the scanning line; an image signal line (2) formed across the scanning line (1) and the storage capacitance line (3) through an insulating layer; and a pixel electrode (6) being surrounded with the scanning line (1), the storage capacitance line (3) and the image signal line (2); wherein at least one overlapped area (11) of the storage capacitance line (3) and the image signal line (2) is defined in the area other than the crossing region of the storage capacitance line (3) and the image signal line (2) within one pixel area; whereby breakage of the image signal line is mended without increasing the production steps, and production yield is improved.

2 Claims, 7 Drawing Sheets

METHOD OF MENDING BREAKAGE OF LINE IN DISPLAY DEVICE

CROSS REFERENCE TO RELATED APPLICATIONS

This application is a division of patent application Ser. No. 10/210,713, filed Jul. 30, 2002 now abandoned, hereby incorporated by reference in its entirety.

BACKGROUND OF THE INVENTION

The present invention relates to a display device being able to mend a breakage of image signal line, a method of manufacturing the display device, and method of mending breakage of line in display devices, particularly appropriate for applying to liquid crystal display device.

Figure 6:
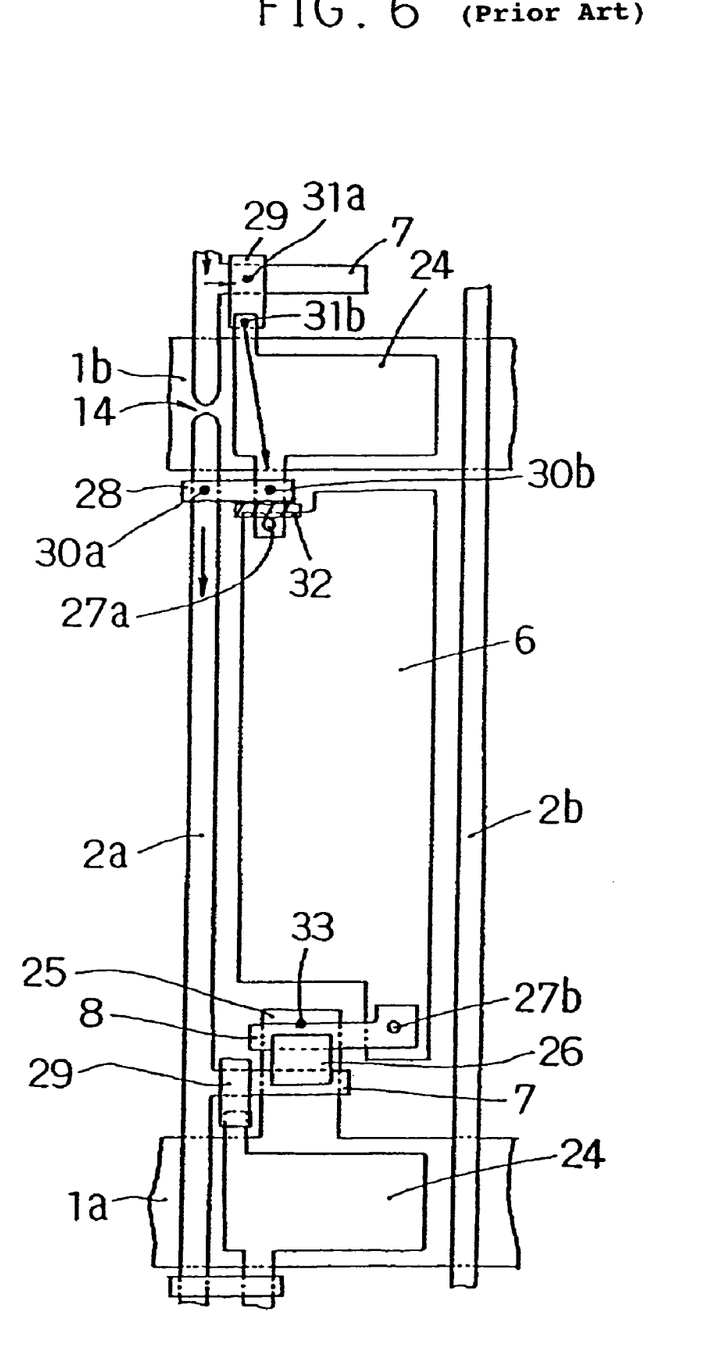
FIG. 6 is a plan view showing approximately one pixel in a display device in prior art.

In the conventional display devices such as active-matrix type liquid crystal display, mending method of a breakage of image signal line, is disclosed for example in Japanese Unexamined Patent Publication No. 61852/1997. FIG. 6 is a plan view showing approximately one pixel in the conventional liquid crystal display. In FIG. 6, numerals 1a, 1b denote a scanning line, numeral 2a, 2b denote an image signal line, numeral 6 denotes a pixel electrode, numeral 7 denotes a source electrode, numeral 8 denotes a drain electrode, numeral 14 denotes breakage in a part of the scanning line 2a, numeral 24 denotes a storage capacitance electrode (a first conductive electrode), numeral 25 denotes a gate electrode, numeral 26 denotes a channel protecting film (insulating layer), numerals 27a, 27b denote a contact hole, numeral 28 denotes a second conductive electrode, numeral 29 denotes a third conductive electrode, numerals 30a, 30b, 31a, 31b denote a point in which a laser light is irradiated.

In FIG. 6, a mending method will be explained for the case that image signal line 2a breaks at a crossing area with scanning line 1b. In this case, laser light is irradiated at two points, 31a and 31b, so that a branching area of the image signal line 2a is electrically connected to the third conductive electrode 29, and the third conductive electrode 29 is electrically connected to storage capacitance electrode 24. Then, laser light is irradiated at the two points, 30a and 30b, so that the image signal line 2a is electrically connected to the second conductive electrode 28, and the second conductive electrode 28 is electrically connected to storage capacitance electrode 24. And, laser light is irradiated at the point 32, storage capacitance electrode 24 is separated from pixel electrode 6. Further, laser light is irradiated at the point 33, thereby drain electrode 8 and gate electrode 25 in thin film transistor are electrically connected. By the above treatments, a path line is formed as shown by a series of arrows in FIG. 6. Storage capacitance electrode 24 is utilized as a part of signal electrode thus a breakage of image signal line is mended.

However, in above mentioned technology, although mending of an image signal line is possible, there is a problem that a pattern for mending of image signal line is needed, which causes an increase in the number of masks and the number of production steps. Further, a region for the mending pattern is required, which causes a decrease in aperture ratio in a pixel.

Figure 7:
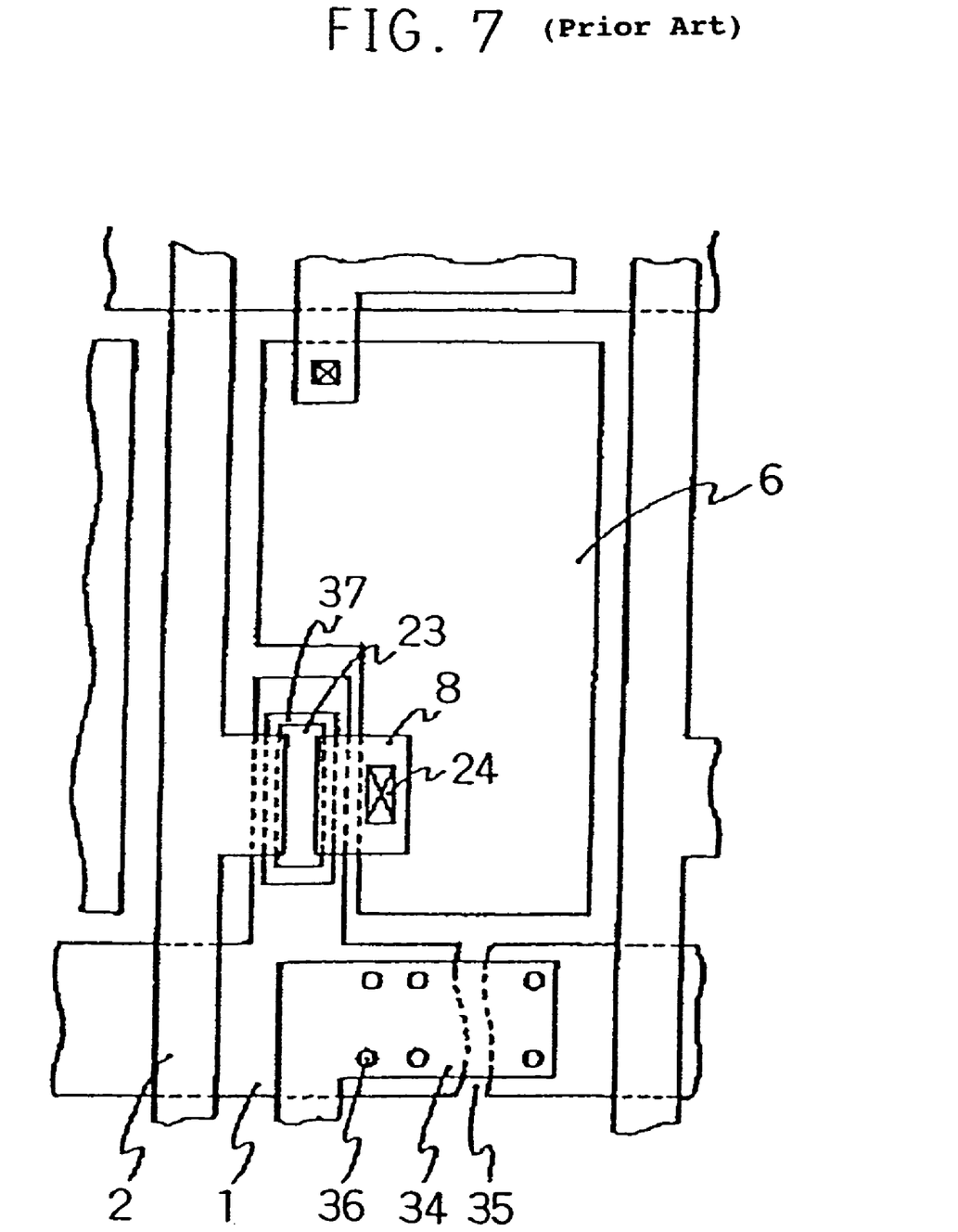
FIG. 7 is also a plan view showing approximately one pixel in a display device in prior art.

Besides, the prior art for mending of a broken line by use of a storage capacitance line is disclosed for example in Japanese Unexamined Patent Publication No. 61852/1997. FIG. 7 shows a structure of approximately one pixel of a conventional liquid crystal display device in the prior art, where like reference numerals are used to identify like parts as that in FIG. 6. In FIG. 7, when scanning line 1 is broken at a broken point 35, the broken point 35 is bypassed through a storage capacitance electrode 34 with laser radiating on the laser radiating point 36, thus broken line is mended. However, in said prior art, although the breakage of the scanning line is mended by bypassing through the storage capacitance electrode, there is no description on mending of a breakage of the image signal line. Further, because the storage capacitance line 34 used for mending is connected to pixel electrode 6 through a contact hole, it is difficult to mend the breakage in the image signal line by using storage capacitance line.

The present invention aims at solving the above problems and at improving the production yield through mending the breakage of image signal line without increase of process steps or decrease of aperture ratio.

SUMMARY OF THE INVENTION

The first display device according to the present invention is a display device comprising:
a scanning line formed on an insulating substrate;
a storage capacitance line formed in parallel to said scanning line;
an image signal line formed across said scanning line and said storage capacitance line through an insulating layer; and
a pixel electrode being surrounded with said scanning line, said storage capacitance line and said image signal line;
wherein at least one overlapped area of said storage capacitance line and said image signal line is formed in an area other than the crossing region of the storage capacitance line and the image signal line within one pixel area. In the display device with above features, it is possible to mend a breakage of the image signal line without increase of the numbers of production steps.

The second display device according to the present invention is a display device which is involved by the first display device according to the present invention, where said overlapped area of said storage capacitance line and said image signal line is formed by said image signal line and an extended area of said storage capacitance line which extends along one peripheral edge of said pixel electrode. In the display device with above features, it is possible to mend a breakage of the image signal line without increase of the numbers of production steps.

The third display device according to the present invention is a display device which is involved by the first or the second display device according to the present invention, where at least two overlapped area of the image signal line and said storage capacitance line or extended area of storage capacitance line are formed within one pixel area. In the display device with above features, it is possible to mend a breakage of the image signal line without increase of the numbers of production steps.

The fourth display device according to the present invention is a display device which is involved by the first, the second or the third display device according to the present invention, where said overlapped area of the image signal line and said storage capacitance line or extended area of storage capacitance line has the area more than 4 micron by 10 micron square. In the display device with above features, it is possible to mend a breakage of the image signal line without increase of the numbers of production steps.

The first method of manufacturing a display device according to the present invention is method of manufacturing a display device including a scanning line formed onto an insulating substrate, a storage capacitance line formed in parallel to said scanning line, an image signal line formed across said scanning line and said storage capacitance line through an insulating layer, and a pixel electrode being surrounded with said scanning line, said storage capacitance line and said image signal line;

said method comprising a step of forming at least one overlapped area of said storage capacitance line and said image signal line in the area other than the crossing region of said storage capacitance line and said image signal line within one pixel area. In the fabrication method of the display device with above features, it is possible to mend a breakage of the image signal line without increase of the numbers of production steps.

The second method of manufacturing a display device according to the present invention is a method of manufacturing a display device which is involved by the first method of manufacturing a display device according to the present invention, wherein said step of forming said overlapped area of said storage capacitance line and said image signal line is formed further includes a step of forming said overlapped area by said image signal line and an extended area of said storage capacitance line which extends along one peripheral edge of the pixel electrode. In the fabrication method of the display device with above features, it is possible to mend a breakage of the image signal line without increase of the numbers of manufacturing steps.

The third method of manufacturing a display device according to the present invention is method of manufacturing a display device which is involved by the first or the second method of manufacturing a display device according to the present invention, wherein said step of forming said overlapped area of said storage capacitance line and said image signal line further includes a step of forming at least two overlapped area of the image signal line and said storage capacitance line or extended area of storage capacitance line within one pixel area. In the method of manufacturing the display device with above features, it is possible to mend a breakage of the image signal line without increase of the numbers of production steps.

The fourth method of manufacturing a display device according to the present invention is method of manufacturing a display device which is involved by the first, the second or the third method of manufacturing a display device according to the present invention, wherein in said step of forming said overlapped area of said storage capacitance line and said image signal line, said overlapped area of the image signal line and said storage capacitance line or extended area of storage capacitance line has the area more than 4 micron by 10 micron square. In the method of manufacturing the display device with above features, it is possible to mend a breakage of the image signal line without increase of the numbers of manufacturing steps.

The first method of mending the broken line in a display device according to the present invention is a method of mending the broken line in a display having a scanning line formed on an insulating substrate, a storage capacitance line formed in parallel to said scanning line, an image signal line being formed across said scanning line and said storage capacitance line through an insulating layer, and a pixel electrode being surrounded with said scanning line, said storage capacitance line and said image signal line, wherein said method includes steps of:

forming at least one overlapped area of said image signal line and the extended area of said storage capacitance line which extends along one peripheral edge of said pixel electrode in the area other than the crossing region of storage capacitance line and image signal line within one pixel area;

connecting extended part of said storage capacitance line with said image signal line in said overlapped area of extended part of said storage capacitance line and said image signal line; and separating a region between a region closest to said storage capacitance line from said storage capacitance line in a connected area of extended part of said storage capacitance line and said image signal line. In the method of mending the display device with above features, it is possible to mend a breakage of the image signal line without increase of the numbers of manufacturing steps.

The second method of mending the broken line in a display device according to the present invention is a method of mending the broken line in a display which is involved by the first method of mending the broken line in a display device according to the present invention, wherein said step of forming overlapped area of extended part of said storage capacitance line and said image signal line further including a step of forming at least two overlapped area of extended part of extended part of said storage capacitance line and said image signal line within one pixel region. In the method of mending the display device with above features, it is possible to mend a breakage of the image signal line without increase of the numbers of manufacturing steps.

The third method of mending the broken line in a display device according to the present invention is a method of mending the broken line in a display which is involved by the first or the second method of mending the broken line in a display device according to the present invention, where a process in which in said overlapped area of extended part of said storage capacitance line and said image signal line, extended part of said storage capacitance line and said image signal line are connected includes a process in which extended part of said storage capacitance line and said image signal line are connected by laser radiation. In the mending method of the display device with above features, it is possible to mend a breakage of the image signal line without increase of the numbers of production steps.

The fourth method of mending the broken line in a display device according to the present invention is a method of mending the broken line in a display which is involved by the first, the second or the third method of mending the broken line in a display device according to the present invention, wherein said step of separating a region between a region closest to said storage capacitance line from said storage capacitance line in a connected area of extended part of said storage capacitance line and said image signal line further includes a step of separating a region between a region closest to said storage capacitance line from said storage capacitance line by laser radiation process in a connected area of extended part of said storage capacitance line and said image signal line. In the mending method of the display device with above features, it is possible to mend a breakage of the image signal line without increase of the numbers of production steps.

The fifth method of mending the broken line in a display device according to the present invention is a method of mending the broken line in a display which is involved by the first method of mending the broken line in a display device according to the present invention, wherein said step of separating a region between a region closest to said storage capacitance line from said storage capacitance line in a connected area of extended part of said storage capacitance line and said image signal line is replaced to a step of separating extended part of the storage capacitance line which extends along the opposite edge of one peripheral edge of said pixel electrode from said pixel electrode in a connected area of extended part of said storage capacitance line and said image signal line, and also in a region including a region between a region closest to said storage capacitance line and said storage capacitance line, being parallel to storage capacitance line. In the method of mending the display device with above features, it is possible to mend a breakage of the image signal line without increase of the numbers of manufacturing steps.

The sixth method of mending the broken line in a display device according to the present invention is a method of mending the broken line in a display which is defined as the fifth method of mending the broken line in a display device according to the present invention, wherein said step of separating extended part of the storage capacitance line which extends along the opposite edge of one peripheral edge of said pixel electrode is separated from said pixel electrode in a connected area of extended part of said storage capacitance line and said image signal line, and also in a region including a region between a region closest to said storage capacitance line and said storage capacitance line, being parallel to storage capacitance line is replaced to a step of separating extended part of the storage capacitance line which extends along the opposite edge of one peripheral edge of said pixel electrode from said pixel electrode by a laser radiation in a connected area of extended part of said storage capacitance line and said image signal line, and also in a region including a region between a region closest to said storage capacitance line and said storage capacitance line, being parallel to storage capacitance line. In the method of mending the display device with above features, it is possible to mend a breakage of the image signal line without increase of the numbers of manufacturing steps.

DETAILED DESCRIPTION OF THE INVENTION

Figure 1:
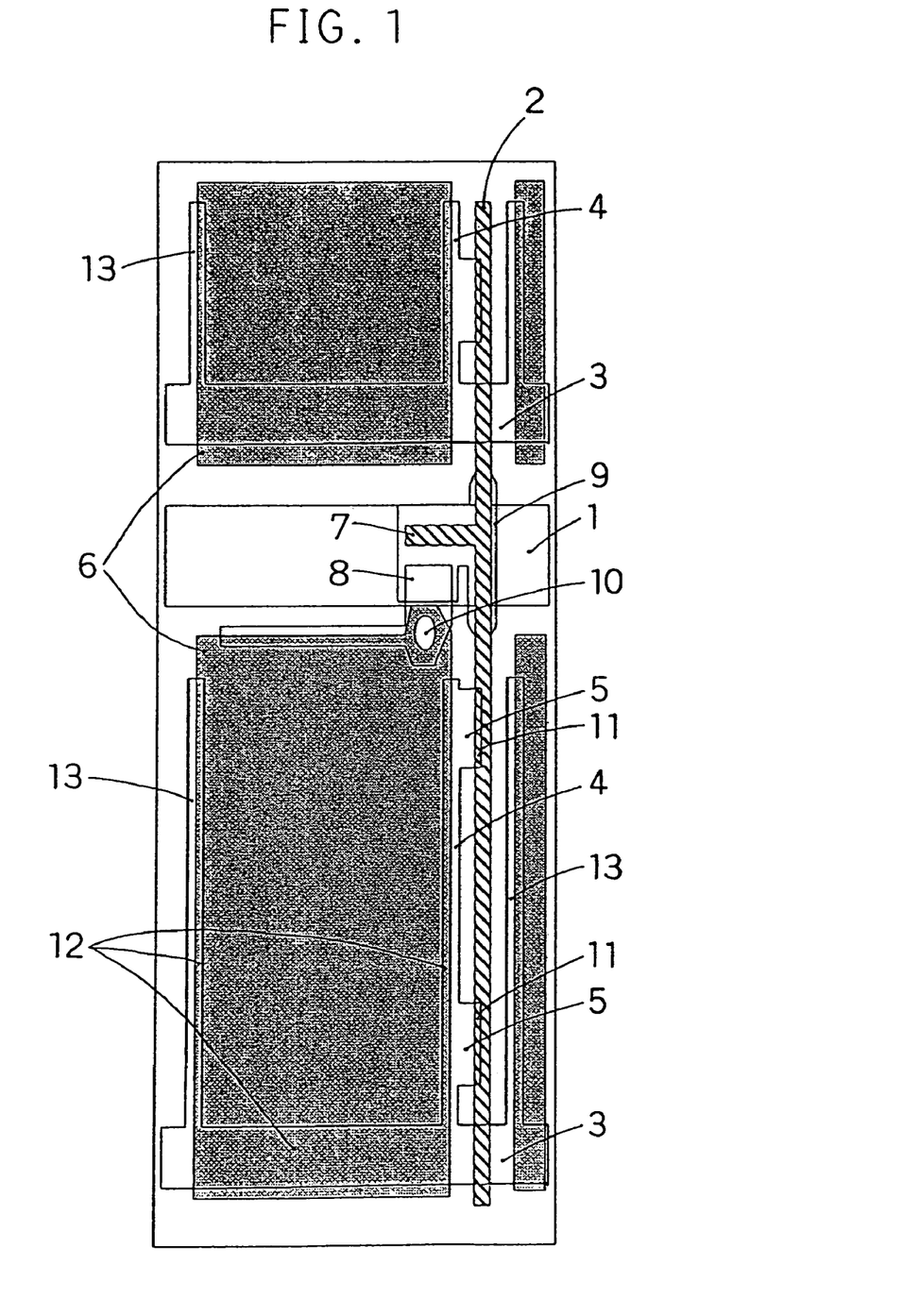
FIG. 1 is a plan view showing approximately one pixel in a display device according to the first embodiment of the present invention.
Figure 2:
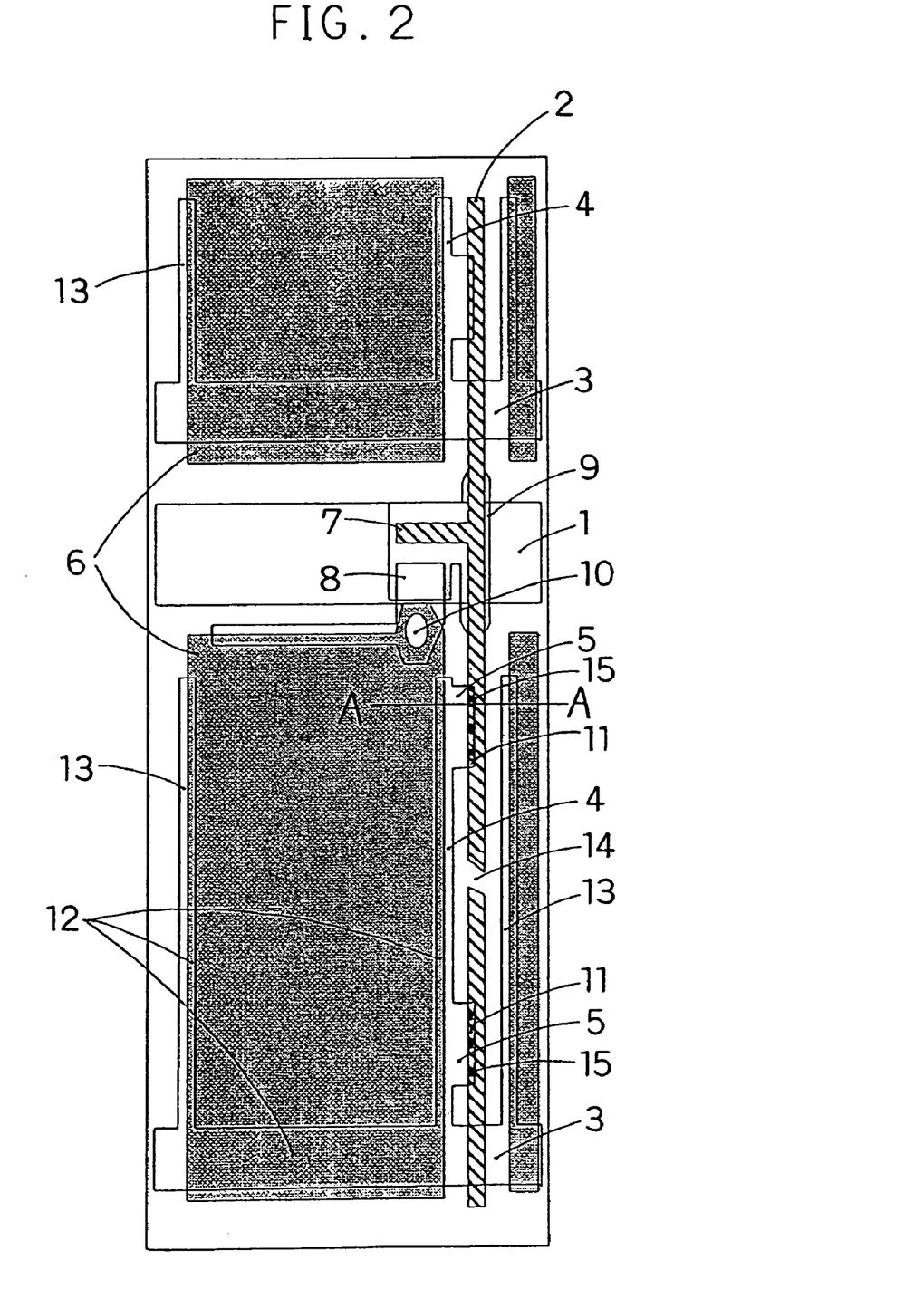
FIG. 2 is the first plan view illustrating mending method of a broken image signal line according to the first embodiment of the present invention.
Figure 3:
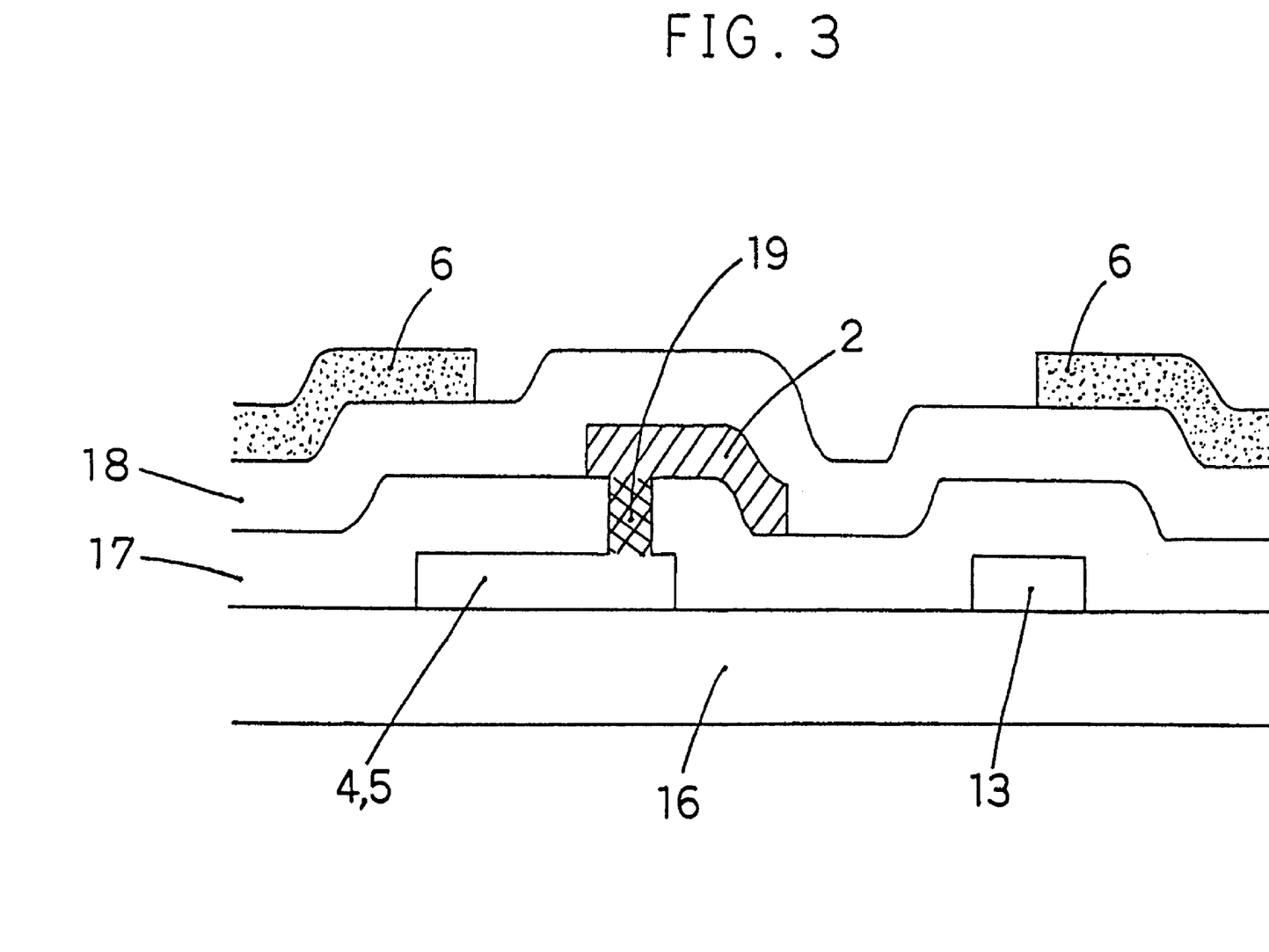
FIG. 3 is a cross sectional view taken along line A-A in the FIG. 2.
Figure 4:
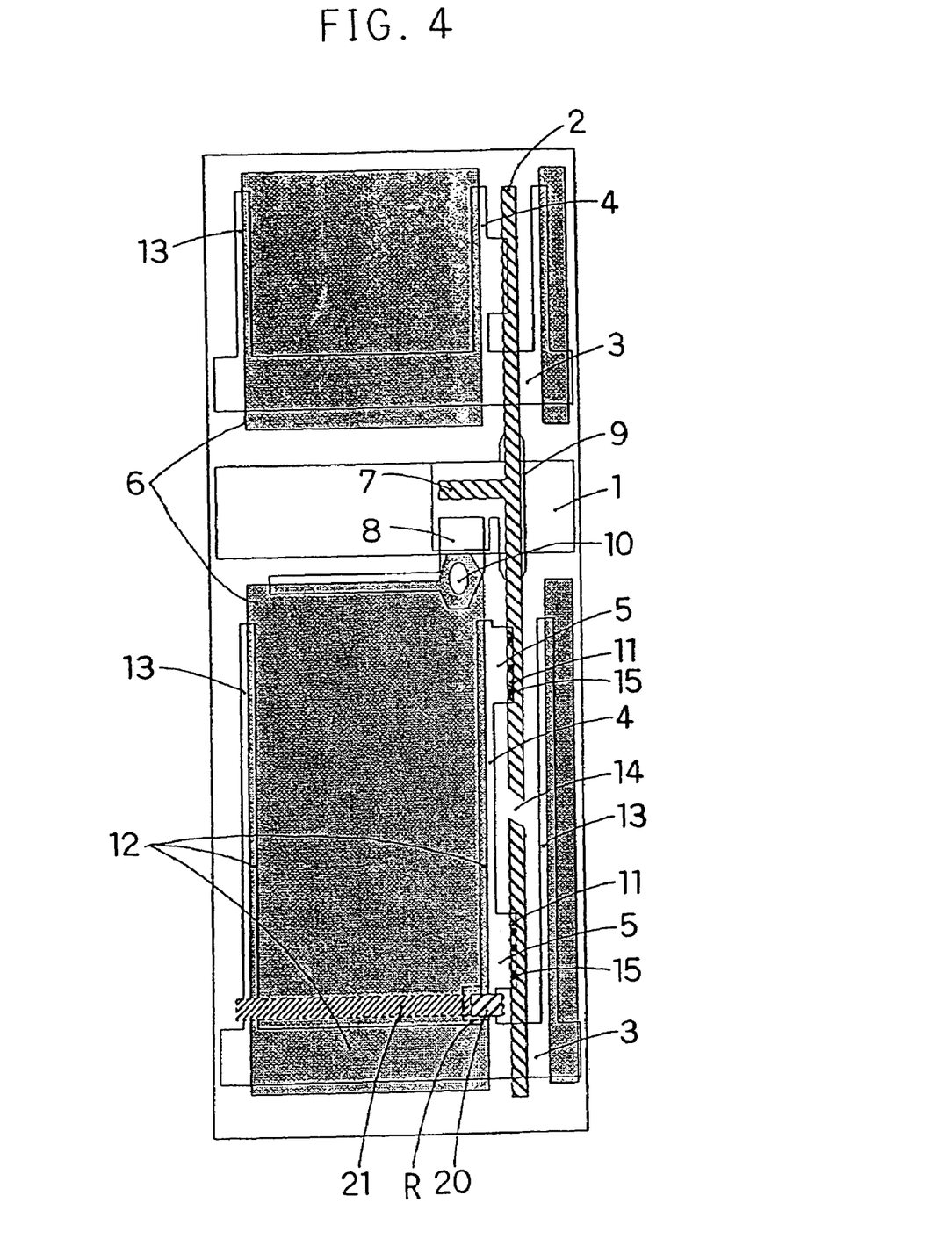
FIG. 4 is the second plan view illustrating mending method of a broken image signal line according to the first embodiment of the present invention.

The first embodiment of the present invention is described with reference to FIGS. 1–4. FIG. 1 is a plan view of approximately one pixel in active-matrix type liquid crystal display using a thin film transistor (hereafter called TFT) according to the present invention. FIG. 2 is a first plan view illustrating the mending method of the broken image signal line. FIG. 3 is a cross sectional view taken along the line A—A in FIG. 2. FIG. 4 is a second plan view illustrating the mending method of the broken image signal line.

FIG. 1 is a plan view showing approximately one pixel having a common Cs structure where storage capacitance is obtained with an overlapped area of a pixel electrode and storage capacitance line and its extended part. The fabricating process is described with reference to FIGS. 1 to 3. The first conductive film which later forms scanning line 1 and storage capacitance line 3, is deposited on an insulating substrate 16. The first conductive film is made of metal film such as Al, Cr, Cu, Ta, Mo or alloys of these metals and other additional substances. Next, with photolithography, the first conductive film is patterned to form scanning line 1 and storage capacitance line 3. As shown in FIG. 1, the storage capacitance line 3 is patterned so that an extended part 4 of the storage capacitance line which extends along one peripheral edge (side) of the pixel electrode is formed in the area other than crossing region of storage capacitance line 3 and image signal line 2 within one pixel area, and further the extended part 4 of said storage capacitance line has projecting part 5 and the said projecting part 5 has the area 11 where projecting part overlaps with image signal line 2.

In the present embodiment, the said overlapped area 11 is formed at two positions being near each end along elongated direction of image signal line in one pixel so that the potential mending area of any broken line is as wide as possible. Further, the overlapped area 11 is patterned so that an extended part 13 of storage capacitance line is formed along the edge opposite to one peripheral edge of the said pixel electrode.

Then, with use of coating apparatus such as plasma CVD, gate insulator layer 17, semiconductive layer 9, and an ohmic contact layer (not shown) are coated in series. Gate insulator 17 is made of SiNx, SiOx, SiOxNy or layered films of them. Semiconductive layer 9 is made of amorphous silicon (a-Si) or polycrystalline silicon (p-Si). Further as ohmic contacting layer, n-a-Si or n-p-Si which is a-Si or p-Si contained with small amount dopant such as phosphor, is used. Then with photolithography, semiconductive layer and ohmic contacting layer are patterned for example by dry-etching process.

Next, the second conductive film is coated which forms later image signal line 2. As the second conductive layer, Al, Cr, Cu, Ta, Mo, or alloys of these metals and other additional substance, layered films with different metallic layer or layer which composition varies in the direction of film thickness can be used. Then, with photolithography, the layer is patterned to form image signal line. At the time of patterning of the image signal line, source electrode 7 and drain electrode 8 are also formed.

Next, with use of coating apparatus such as plasma CVD, interlayer insulating film 18 is coated. Then, with photolithography, said interlayer insulating film 18 is patterned. As the interlayer insulating film, SiNx, SiOx, SiOxNy or the layered film of them is used as for the gate insulating film 17. By patterning of the interlayer insulating film 18, contact hole 10 is formed. As a result, drain electrode 8 can be electrically connected to pixel electrode 6 later mentioned through said contact hole 10.

And, conductive film being transparent metal such as ITO or $SnO_2$, which later forms pixel electrode 6, is coated on the interlayer insulating film 18 and with photolithography, said conductive film is patterned so that said conductive film is surrounded with scanning line 1, storage capacitance line 3 and image signal line 2, thus insulating substrate with TFT formed (hereafter called arraying substrate) is completed.

During fabrication of arraying substrate as described above, due to a foreign substance generated in the step of coating or patterning of image signal line, there may occur a breakage 14 of the image signal line as in FIG. 2. Said breakage of the line is discovered by the inspection with image inspection monitor in each step of fabrication of arraying substrate. Normally, when a breakage of an image signal line occurs, the voltage is supplied from the drive circuit to the breakage point but not supplied to the far side from said breakage point, which brings about a decrease in production yield due to line failure.

Accordingly, to mend the breakage of the line, as shown in FIG. 2, by radiation of laser at the laser radiating area 15 in overlapped area 11 of image signal line 2 and projecting part 5 in extended area 4 of the storage capacitance line which extends along one peripheral edge of the pixel electrode, as shown in FIG. 3, melted metal 19 connects the extended area 4 of storage capacitance line and image signal line 2. The laser light is preferably YAG laser or EXCIMER laser, and more preferably, wavelength of the laser light is in the range of 0.1 to 1.06 micron. The laser light may be irradiated from either side, top surface (image signal line side) or bottom surface (storage capacitance line side) of the arraying substrate. As for the intensity of the laser light, output density of the laser irradiated on metal as above is preferably in the range of 1E+2 to 1E+4 $J/m^2$. The radiation area of the laser at laser radiating area 15 is preferably approximately 2 micron in diameter. Further, from the viewpoint of stability in contact resistance, the laser is preferably irradiated at 3 or 4 points in the overlapped area of 11 of image signal line 2 and projecting part 5 in the extended area 4 of the storage capacitance line which extends along one peripheral edge of the pixel electrode.

The required area of the overlapped area 11 of image signal line 2 and projecting part 5 in the extended area 4 of the storage capacitance line which extends along one peripheral edge of the pixel electrode, depends on the width of image signal line 2 and accuracy in positioning of storage capacitance line and image signal line in the patterning step. When the overlapped area is larger than approximately 2 micron by 5 micron square, it can be connected, and when it is larger than 4 micron by 10 micron square, a laser radiating area of 2 micron in diameter can be certainly irradiated at 3 or 4 points in it even if there occur errors of position (1 micron at maximum) of said storage capacitance line and image signal line, which brings preferable results of a more stable connection of the lines and more reliable mending of the breakage of the line.

Next, the laser is irradiated to cut a cutting area 20 (FIG. 4) which is between the storage capacitance line 3 and the region closest to the storage capacitance line 3 in connected area in the overlapped area of the image signal line 2 and projecting part 5 in extended area 4 of the storage capacitance line which extends along one peripheral edge of the pixel electrode. By doing this, a short-circuit between the voltage supplied to the storage capacitance line and the voltage supplied to the image signal line is prevented.

Further, cutting by laser radiation is preferably done at only cutting point 20, however, in actual cutting of the cutting point 20 by laser, the pixel electrode 6 may be conducted to the extended area 4 of the storage capacitance line which extends along one peripheral edge of the pixel electrode, and further the storage capacitance line 3 may be conducted to the pixel electrode 6, which results in a short-circuit in image signal line and the pixel electrode. In this case, short-circuit in image signal line and the storage capacitance line can be certainly prevented by cutting the region which includes; the cutting region 20 which is between the storage capacitance line 3 and the region closest to the storage capacitance line 3 in the connected area of the image signal line and the projecting part of the extended part of the storage capacitance line which extends along one peripheral edge of the pixel electrode, and also include the extended part of the storage capacitance line which extends along the pixel electrode 6 and the opposite edge of one peripheral edge of the pixel electrode, being parallel to the storage capacitance line.

In this case, voltage of the pixel becomes equal to that of the image signal line, which means that the pixel consequently becomes a failure. However, by such treatment, a substantial line failure due to a breakage of the image signal line can be converted to a slight damage of point failure, which enables an increase in the production yield for the display device.

Further, in order to prevent the short-circuit of the image signal line and the storage capacitance line due to the laser radiation on the cutting area 20, the pixel electrode 6 may be patterned so as not to overlap the cutting area 20 as in shown as R in FIG. 4. In this case, pixel electrode 6 is patterned so that said pixel electrode 6 is separated enough from both the storage capacitance line 3 or the extended part 4 of the storage capacitance line which extends along one peripheral edge of the pixel electrode, thereby no conduction occurs there during laser radiation on the cutting area 20. By adopting such a structure, laser cutting may be confined to the cutting area 20, and therefore such a structure prevents a short-circuit of the image signal line and the storage capacitance line, suppresses a point failure of the pixel, and is effective to obtain a liquid crystal display with excellent display quality.

Due to the structure or process described above, a breakage of the image signal line can be mended with neither inconvenience such as short-circuit of the image signal line and the storage capacitance line nor increase in the number of production steps.

Furthermore, although the present embodiment shows an example where there are two overlapped areas 11 of the image signal line and the projecting part in an extended part of the storage capacitance line which extends along one peripheral edge of the pixel electrode, it does not mean that the number of the overlapped areas is limited to two. There may be three overlapped areas, and further even only one overlapped area with its area as large as possible within one pixel may enable to mend a breakage of the image signal line. Even in the case where only one overlapped area 11 in the pixel is provided, a short-circuit of the image signal line and the storage capacitance line can be prevented by forming and cutting the region near the storage capacitance line, where an extended part 4 of the storage capacitance line and the image signal line 2 do not overlap so as to retain the cutting area 20, or 21 of the pixel electrode and extended part of the storage capacitance line in FIG. 4.

Figure 5:
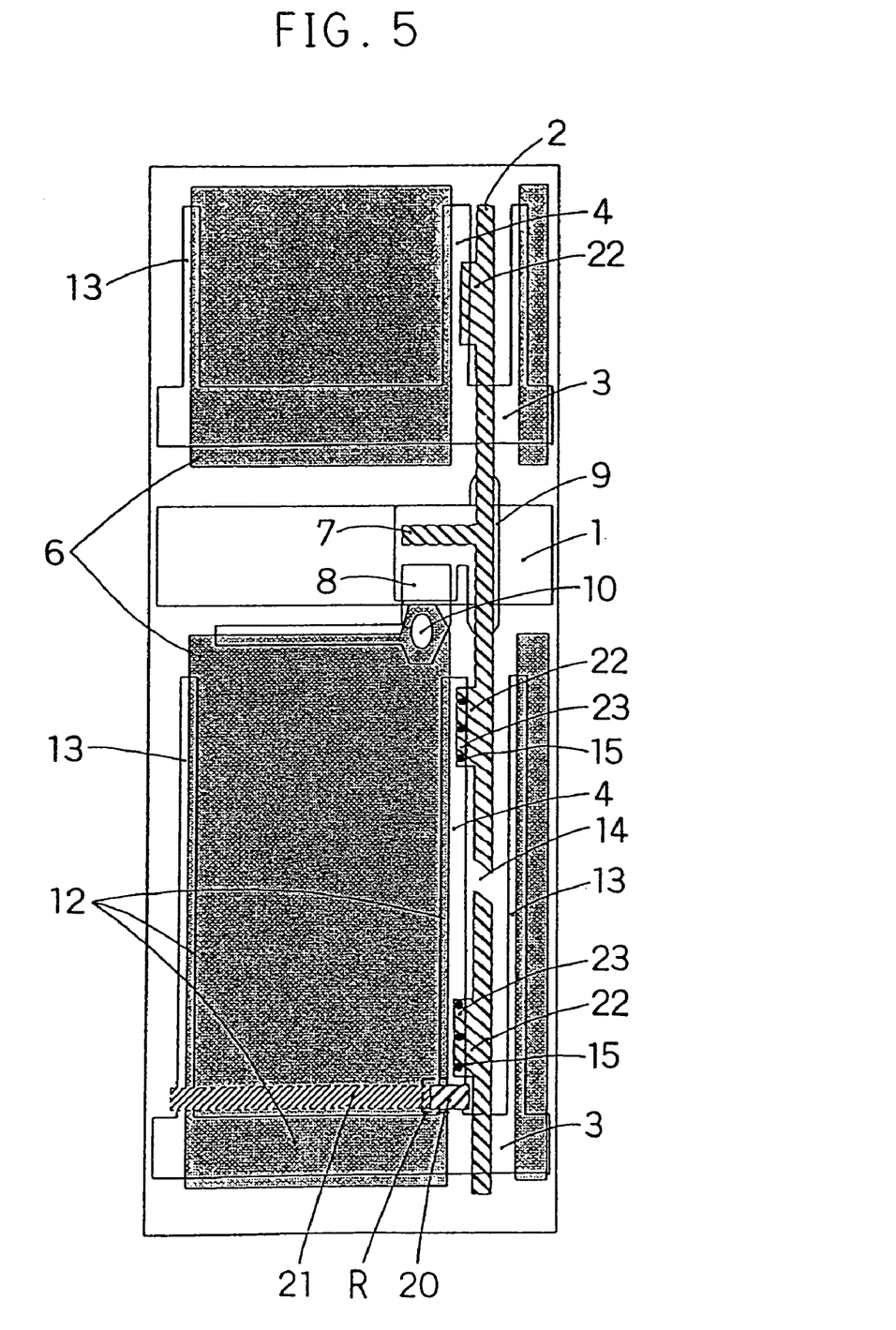
FIG. 5 is a plan view showing approximately one pixel in a display device according to the second embodiment of the present invention.

The second embodiment of the present invention will be described with reference to FIG. 5. FIG. 5 is a plan view of approximately one pixel in active-matrix type liquid crystal display using TFT, where like reference numerals are used to identify like parts as that in FIGS. 1 to 4. In FIG. 5, being different from the first embodiment of the present invention, overlapped area 23 is formed with a projecting part in the image signal line and the extended part of the storage capacitance line which extends along one peripheral edge of the pixel electrode. Fabricating process of the second embodiment according to the present invention is same as that of the first embodiment and is not explained here.

Then, as in the first embodiment of the present invention, a laser is irradiated on the laser radiating area 15 in the overlapped area 23 of the projecting part in the image signal line and the extended part of the storage capacitance line which extends along one peripheral edge of the pixel electrode, thereby the image signal line 2 and extended part 4 of the storage capacitance line are connected. And, as in the first embodiment, the short-circuit of the image signal line and the storage capacitance line can be prevented by cutting the cutting area 20 which is between the storage capacitance line and the region closest to the storage capacitance line, and in the connected area of the projecting part of the image signal line and the extended area of the storage capacitance line which extends along one peripheral edge of the pixel electrode, or as shown as cutting area 21 of the extended part of the storage capacitance line and the pixel electrode in FIG. 5, by cutting the area which includes the cutting area 20 and the extended part of the storage capacitance line which extends along the pixel electrode and the opposite edge of one peripheral edge of the pixel electrode, being parallel to the storage capacitance line. By doing this, a similar effect as in the first embodiment can be expected.

Further, as in the first embodiment of the present invention, the pixel electrode 6 may be patterned so as to not to overlap with the cutting area 20, which is shown as R in FIG. 5. In this case, pixel electrode 6 is patterned so that the pixel electrode 6 is separated enough from both the storage capacitance line 3 and the extending part 4 of the storage capacitance line which extends along one peripheral edge of the pixel electrode, thereby no conduction occurs there during laser radiation on the cutting area 20. By adopting such a structure, laser cutting suffices confined to the cutting area 20 as in the first embodiment, and therefore such a structure prevents a short-circuit of the image signal line and the storage capacitance line, suppresses a point failure of said pixel, and is effective to obtain a liquid crystal display with excellent display quality.

Further, as for the area of the overlapped region 23 of the projecting part of the image signal line and the extended part of the storage capacitance line which extends along one peripheral edge of the pixel electrode, more than 2 micron by 5 micron square may be sufficient, and preferably, more than 4 micron by 10 micron square.

Although in the present embodiment, an example is described where two overlapped regions 23 of the projecting part of the image signal line and the extended part of the storage capacitance line which extends along one peripheral edge of the pixel electrode are formed near each end of the elongated direction of the image signal line within one pixel so as to make the mending area is as wide as possible, it does not mean to suggest any such limitation in the number of the overlapped areas. There may be more than three overlapped regions, or even only one overlapped region with an area as wide as possible within one pixel to enable a mend in a breakage of the image signal line. Even in the case where only one overlapped region 23 is provided in one pixel, by forming and cutting the region near the storage capacitance line 3 in which the projecting part 22 of the image signal line and the extended part of the storage capacitance line do not overlap, so as to retain the cutting part 20 or 21 of the extended part of the storage capacitance line and the pixel electrode in FIG. 4 in the first embodiment, a short-circuit of the image signal line and the storage capacitance line can be prevented.

Further, although in the first and second embodiments, an example where the scanning line and the storage capacitance line are made of identical conductive layer is described, the scanning line and the storage capacitance line may be made of different conductive layer with each other. Further, above embodiments may applicable to every display device which is provided with a storage capacitance line across a image signal line through an insulating layer.

Further, although in the first and second embodiments, display device with liquid crystal is described, they are not limited to the liquid crystal device but applicable to display devices such as electroluminescence device or device using field sequential, or any display device which is provided with a storage capacitance line across a image signal line through an insulating layer.

What is claimed is:

1. A method of mending a broken line in a display device having a scanning line formed on an insulating substrate, a storage capacitance line formed in parallel to the scanning line, an image signal line being formed across the scanning line and the storage capacitance line through an insulating layer, and a pixel electrode being surrounded with the scanning line, the storage capacitance line and the image signal line, wherein the method includes steps of:

forming at least one overlapped area of the image signal line and an extended area of the storage capacitance line which extends along one peripheral edge of the pixel electrode in an area other than the crossing region of storage capacitance line and the image signal line within one pixel area;

connecting an extended part of the storage capacitance line with the image signal line in the at least one overlapped area of the extended part of the storage capacitance line and the image signal line; and separating the extended part of the storage capacitor line from the storage capacitor line at a region of the extended part of the storage capacitor line that is closest to the storage capacitor line, wherein the step of separating further includes separating the pixel electrode in a portion closest to the storage capacitance line and in parallel to the storage capacitance line.

2. The method according to claim 1, wherein the step of separating includes using laser radiation to make the separation.

* * * * *